3,054,812
20β,21-DINITRATO - Δ⁴ - PREGNENE - 17α - OL-3,11-DIONE, ITS PRODUCTION, AND METHOD OF USE
Daniel Bertin, Montrouge (Seine), France, assignor, by mesne assignments, to Roussel-UCLAF, S.A., Paris, France, a corporation of France
No Drawing. Filed Nov. 22, 1961, Ser. No. 154,322
Claims priority, application France Dec. 2, 1960
2 Claims. (Cl. 260—397.45)

The present invention relates to a new compound usable particularly as medicine for the treatment of spasms of coronary origin, namely, 20β,21-dinitrato-Δ⁴-pregnene-17α-ol-3,11-dione, having the formula:

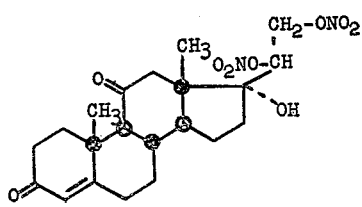

The invention also relates to a novel process for the preparation of said compound, compositions containing said compound and methods of using said compound medically.

The product, 20β,21-dinitrato-Δ⁴-pregnene-17α-ol-3,11-dione, possesses interesting pharmacological properties. It possesses particularly a vasodilatory action on coronary blood vessels. It is useful in the treatment of angina pectoris and coronaritis. It also has a peripheral vasodilatory action and acts as an antispasmodic allowing its use in the treatment of asthma, bronchial spasms and arterial spasms.

It is an object of the invention to provide 20β,21-dinitrato-Δ⁴-pregnene-17α-ol-3,11-dione.

Another object of the invention is the development of a process for the preparation of 20β,21-dinitrato-Δ⁴-pregnene-17α-ol-3,11-dione.

A further object of the invention is to provide therapeutic compositions of 20β,21-dinitrato-Δ⁴-pregnene-17α-ol-3,11-dione and excipients.

Another object of this invention is a method of treatment of spasms of coronary origin comprising treating the organism with from 5 to 25 milligrams per day of 20β,21-dinitrato-Δ⁴-pregnene-17α-ol-3,11-dione.

These and other objects of the invention will become more apparent as the description thereof proceeds.

The compound of the invention, 20β,21-dinitrato-Δ⁴-pregnene-17α-ol-3,11-dione, occurs in the form of a colorless solid compound which is soluble in a mixture of methanol and methylene chloride; slightly soluble in ethanol, acetone, benzene and chloroform; and insoluble in water, ether and isopropyl ether. Its melting point, determined on the Kofler block, is 224–228° C. (with decomposition).

20β,21 - dinitrato-Δ⁴-pregnene-17α-ol-3,11-dione is prepared according to the following reaction diagram:

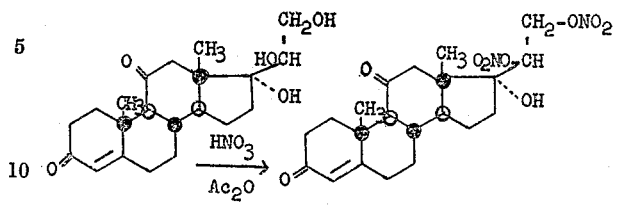

As it is evident, the preparation of the said compound is effected starting from Δ⁴-pregnene-17α,20β,21-tri-ol-3,11-dione (Reichstein's compound U) by a nitration reaction. Preferably the starting compound is reacted with nitric acid in the presence of an organic solvent at temperatures between about 0° C. and about —30° C.

The activity of 20β,21-dinitrato-Δ⁴-pregnene-17α-ol-3,11-dione, with a liminal value of 0.01 µg. per cc., on the coronary blood flow of the isolated rabbit heart predicates its use in the treatment of angina pectoris and coronaritis. The compound presents also a peripheral vasodilatory action and antispasmodic effect, allowing its use in asthma, bronchial spasms and arterial spasms.

The said compound is used (1) by oral ingestion in the form of tablets having 5 mgm., of active material, (2) by parenteral methods in intramuscular injections, in the form of either an aqueous suspension or of an oily solution in a unitary dose of 2 to 10 mgm., (3) by venous injection in solution in an appropriate solvent in a dosage of 2 to 10 mgm., and (4) by rectal methods. It can be prepared in the form of injectable solutions and suspensions prepared in ampoules or in multi-dose flacons, tablets, emulsions, syrups and suppositories.

Preferentially, it is used in the form of injectable solutions and suspensions as prepared in ampoules or in multi-dose flacons, and in the form of tablets or suppositories.

The useful and recommended dosage of active 20β,21-dinitrato-Δ⁴-pregnene-17α-ol-3,11-dione should be controlled between 5 and 25 mgm. per time and per day in the adult, depending on the method of administration.

In the following example there is described a specific embodiment of the invention. However, it is to be understood that the example presents no limiting characteristics and the invention is not to be construed by it.

EXAMPLE

*20β,21-Dinitrato-Δ⁴-Pregnene-17α-Ol-3,11-Dione*

At a temperature in the neighborhood of —10° C., 2.4 cc. of acetic acid anhydride were mixed with 0.8 cc. of fuming nitric acid, which was introduced slowly. The temperature of the reactants was adjusted to a temperature of —20° C. and 0.079 gm. of Δ⁴-pregnene-17α,20β,21-triol-3,11-dione was added thereto. The mixture was agitated for a period of 15 minutes at —10° C., then for a period of 5 minutes at —5° C. and finally for a period of 2 minutes at 0° C. Thereafter, the reaction mixture was poured rapidly into iced water. After a half-hour of standing, the white appearing precipitate, which formed, was separated. The precipitate was vacuum filtered, washed with water and dried under vacuum. The raw dinitrate was obtained with a yield of 97%.

For purification, the raw dinitrate was recrystallized from a mixture of methanol and methylene chloride. The purified 20β,21-dinitrato-Δ⁴-pregnene - 17α-ol-3,11-dione occurred in the form of a colorless, solid compound which was soluble in a mixture of methanol and methylene chloride; slightly soluble in ethanol, acetone, benzene and chloroform; and insoluble in water, ether and isopropyl ether. Its melting point, determined on the Kofler block, was 224–228° C. (with decomposition).

*Analysis.*—$C_{21}H_{28}O_9N_2$; Molecular weight=452.45. Calculated: C, 55.74%; H, 6.24%. Found: C, 55.1%; H, 6.2.

The starting compound, Δ⁴-pregnene-17α,20β,21-triol-3,11-dione, was prepared according to the process described by Sarett (J. Biol. Chem., 1946, 162, 601).

PHARMACOLOGICAL STUDY OF 20β,21-DINITRATO-Δ⁴-PREGNENE-17α-OL-3,11-DIONE

*Action on coronary blood flow.*—The study of the action of the said compound on coronary blood flow was effected in the isolated rabbit heart, by using a technique inspired by Langendorff (Arch. gesam. Physiol., 1895, 61, 291). In this method the heart was suspended by the aorta to a canula and the coronary system was perfused with Locke serum by means of this canula under a constant pressure of 5 cm. of mercury at a pH of 7.2 to 7.3, and a temperature of 37°. 20β,21-dinitrato-Δ⁴-pregnene-17α-ol-3,11-dione was placed in solution in ethanol and this solution was diluted by means of the Locke serum to the desired test concentrations to determine the liminal value.

In a registering apparatus the coronary blood flow was continuously registered and parallelly the ventricular contractions were likewise registered.

The threshold concentration or liminal value of the said compound which clearly augments coronary blood flow in the test was determined and in the table below the results obtained with this compound, as well as with trinitrine and papaverine, under the same experimental conditions are shown.

TABLE.—COMPOUNDS STUDIED

|  | Trinitrine | Papaverine | 20β,21-dinitrato-Δ⁴-pregnene-17α-ol-3,11-dione |
|---|---|---|---|
| Liminal Value in μg./cc. in the perfusion liquid | 1 | 10 | 0.01 |
| Increase in coronary blood flow as percent of normal blood flow | 10 | 20 | 20 |
| Duration of action in minutes | 2–20 | 15 | [1] 15 |
| Effect on Ventricular Contractions: | | | |
| on the Amplitude, percent | 0 | 0 | 0 |
| on the Frequency, percent | −5 | 0 | 0 |

[1] Greater than.

It will be understood that the invention is not limited to the specific mode of execution described above. Particularly, it is evident to one skilled in the art that equivalent techniques may be employed without departing from the spirit of the invention or the scope of the appended claims.

I claim:
1. 20β,21-dinitrato-Δ⁴-pregnene-17α-ol-3,11-dione.
2. The process of preparing 20β,21-dinitrato-Δ⁴-pregnene-17α-ol-3,11-dione which comprises the steps of subjecting Δ⁴-pregnene-17α,20β,21-triol-3,11-dione to the action of nitric acid in the presence of an organic solvent at temperatures between about 0° C. and about −30° C. and recovering said 20β,21-dinitrato-Δ⁴-pregnene-17α-ol-3,11-dione.

No references cited.